(12) United States Patent
Ha

(10) Patent No.: US 11,780,094 B2
(45) Date of Patent: Oct. 10, 2023

(54) AI INTEGRATED SYSTEM FOR OPTIMIZING WASTE MANAGEMENT BY SELF-GUIDED ROBOT

(71) Applicant: Chunyong Ha, Seongnam-si (KR)

(72) Inventor: Chunyong Ha, Seongnam-si (KR)

(73) Assignee: Chunyong Ha, Seongnam-si (KR)

( * ) Notice: Subject to any disclaimer, the term of this patent is extended or adjusted under 35 U.S.C. 154(b) by 629 days.

(21) Appl. No.: 16/690,493

(22) Filed: Nov. 21, 2019

(65) Prior Publication Data
US 2021/0060786 A1 Mar. 4, 2021

(30) Foreign Application Priority Data
Sep. 4, 2019 (KR) .......... 10-2019-0109708

(51) Int. Cl.
| | |
|---|---|
| A47L 9/28 | (2006.01) |
| G01C 21/12 | (2006.01) |
| B25J 9/16 | (2006.01) |
| B25J 13/00 | (2006.01) |
| G06Q 10/30 | (2023.01) |
| G06Q 20/14 | (2012.01) |
| G05B 13/02 | (2006.01) |

(52) U.S. Cl.
CPC ........... *B25J 9/1694* (2013.01); *B25J 13/006* (2013.01); *G06Q 10/30* (2013.01); *G06Q 20/14* (2013.01); *G05B 13/027* (2013.01)

(58) Field of Classification Search
CPC ....... B25J 9/1694; B25J 13/006; G06Q 10/30; G06Q 20/14
See application file for complete search history.

(56) References Cited

U.S. PATENT DOCUMENTS 5,559,696 A * 9/1996 Borenstein ............. G01C 21/12
701/23
5,815,880 A * 10/1998 Nakanishi ........... A47L 11/4044
15/340.1
(Continued)

FOREIGN PATENT DOCUMENTS

CN 107472752 A 12/2017
KR 10-0942544 B1 2/2010
(Continued)

*Primary Examiner* — Talia F Crawley
(74) *Attorney, Agent, or Firm* — NKL LAW; Jae Youn Kim

(57) ABSTRACT

A centralized hub system for improving automatic waste transport and collection using a self-driving robot, which allows for self-driving and efficient collection of waste in densely populated areas, such as apartment complexes and residential neighborhoods, and areas with a floating population by using robots with built-in artificial intelligence software and hardware and self-driving waste collection and driving functions and an integrated management server for monitoring these robots, and which helps to put information together in this process and use it as base data for the efficient operation of future waste policies and the corresponding systems. The centralized hub system for improving automatic waste transport and collection using a self-driving robot comprises self-driving inlet robots, an integrated management server, and a self-driving vehicle robot.

3 Claims, 13 Drawing Sheets

(56) References Cited

U.S. PATENT DOCUMENTS

| | | | | |
|---|---|---|---|---|
| 2006/0235585 | A1* | 10/2006 | Tanaka | G05D 1/0246 |
| | | | | 701/23 |
| 2006/0253224 | A1* | 11/2006 | Tani | G05D 1/0242 |
| | | | | 701/23 |
| 2016/0355308 | A1* | 12/2016 | Poss | B65F 1/1426 |
| 2017/0011580 | A1* | 1/2017 | Huang | G06Q 10/30 |
| 2017/0121107 | A1* | 5/2017 | Flood | G06Q 50/26 |
| 2018/0074511 | A1* | 3/2018 | Rodoni | B65F 3/02 |
| 2018/0286250 | A1* | 10/2018 | Cronin | G05D 1/028 |
| 2019/0121368 | A1* | 4/2019 | Bussetti | B65F 1/02 |
| 2019/0130560 | A1* | 5/2019 | Horowitz | G06F 18/41 |
| 2021/0060786 | A1* | 3/2021 | Ha | B65F 3/02 |

FOREIGN PATENT DOCUMENTS

| | | |
|---|---|---|
| KR | 10-2012-0001277 A | 1/2012 |
| KR | 10-1625332 B1 | 6/2016 |
| KR | 10-1975575 B1 | 5/2019 |
| KR | 10-1974641 B1 | 8/2019 |

* cited by examiner

AI INTEGRATED SYSTEM FOR OPTIMIZING WASTE MANAGEMENT BY SELF-GUIDED ROBOT

BACKGROUND OF THE INVENTION

Field of the Invention

The present disclosure relates to a centralized hub system for improving automatic waste transport and collection using a self-driving robot, which allows for self-driving and efficient collection of waste in densely populated areas, such as apartment complexes and residential neighborhoods, and areas with a floating population by using robots with built-in artificial intelligence software and hardware and self-driving waste collection and driving functions and an integrated management server for monitoring these robots, and which helps to put information together in this process and use it as base data for the efficient operation of future waste policies and the corresponding systems.

Related Art

Along with the development of the machinery industry since the Industrial Revolution, most of the infrastructure (including electricity, water supply, gas supply, drainage, heating, etc.) dependent on human labor now involves equipment and devices that provide services to final consumers in a convenient, efficient, safe, sanitary, and non-muscle-dependent way, all based on automated infrastructure facilities. However, most of the waste collection methods, systems, and programs, still largely dependent on human labor, are non-environmentally friendly, non-sanitary, and inefficient, cause inconvenience and noise, and incur high costs and difficulties in performing 3D job. This slows the pace of replacement of the existing infrastructure facilities by good-quality ones that are more fundamental, epoch-making, environmentally-friendly, adaptable to smart city applications, and economically efficient, which can be seen as the background of this disclosure.

RELATED ART DOCUMENTS

Patent Documents (Patent Document 1) Korean Patent Registration No. 10-1625332 (registered on Jun. 7, 2016), "An automatic waste collection system using food waste reduction and disposal equipment".

(Patent Document 2) Korean Patent Registration No. 10-0942544 (registered on Feb. 12, 2010), "A combined automatic waste collection facility".

SUMMARY OF THE INVENTION

The present disclosure provides a centralized hub system for improving automatic waste transport and collection using a self-driving robot, which allows for self-driving and efficient collection of waste in densely populated areas, such as apartment complexes and residential neighborhoods, and areas with a floating population by using robots with built-in artificial intelligence software and hardware and self-driving waste collection and driving functions and an integrated management server for monitoring these robots, and which helps to put information together in this process and use it as base data for the efficient operation of future waste policies and the corresponding systems.

An exemplary embodiment of the present disclosure provides a centralized hub system for improving automatic waste transport and collection using a self-driving robot, the system comprising self-driving inlet robots and a web-based integrated management server, the self-driving inlet robots each comprising a body portion, a sensor portion, a waste collection behavior portion, and a controller, the body portion being formed with at least one between a top inlet and side inlet for receiving waste and a first outlet for discharging waste, and comprising a moving means, the sensor portion comprising a lidar sensor, a radar sensor, a GPS, and a weight measuring sensor that are mounted to the body portion, the waste collection behavior portion comprising a first waste collection arm and second waste collection arm that are mounted to the body portion and grip waste and put the same into the top inlet and side inlet, respectively, a compression plate that opens and closes the top inlet and compresses the waste in the body portion by vertical movement, and a side door rotatably mounted to the body portion so as to open and close the side inlet, and the controller being configured to control the operations of each component of the waste collection behavior portion and the moving means of the body portion and to preset a capacity limit for the waste stored in the body portion and control the moving means in such a way as to enable self-driving to a pre-designated waste disposal site if the amount of waste disposed into the body portion is higher than the capacity limit, and the integrated management server being configured to receive, store, and manage at least one among user identification information, waste type information, waste measurement information, charging information, and payback information transmitted from the self-driving inlet robots, and being installed in a pre-designated place where the self-driving inlet robots gather together, wherein the self-driving inlet robots operate as either a first type which makes a measurement on a waste item based on either weight, volume, or number and then charges a fee or not based on the measurement information, or a second type which makes a measurement on a recyclable waste item based on either weight, volume, or number and then pays back a fee or not based on the measurement information.

The system further comprises an self-driving vehicle robot comprises a driving body portion, a disposal means, a sensing portion, and a controller, the driving body portion comprising a first inlet on the top and a second inlet on the side, which are for putting waste in, a second outlet for discharging waste, and a transportation device, the disposal means being mounted to the driving body portion, for putting the waste stored in the self-driving inlet robot into the driving body portion, the sensing portion comprising a GPS for self-driving and other sensors, and being mounted to the driving body portion, and the controller being configured to control the operations of the transportation device of the driving body portion and the disposal means, based on a signal sensed by the sensing portion and a preset driving program, wherein the self-driving vehicle robot drives itself, collects waste, and self-drives and returns to a pre-designated waste disposal site, in response to an operation request signal received from the outside or on a preset self-driving cycle.

DESCRIPTION OF EXEMPLARY EMBODIMENTS

Figure 1:
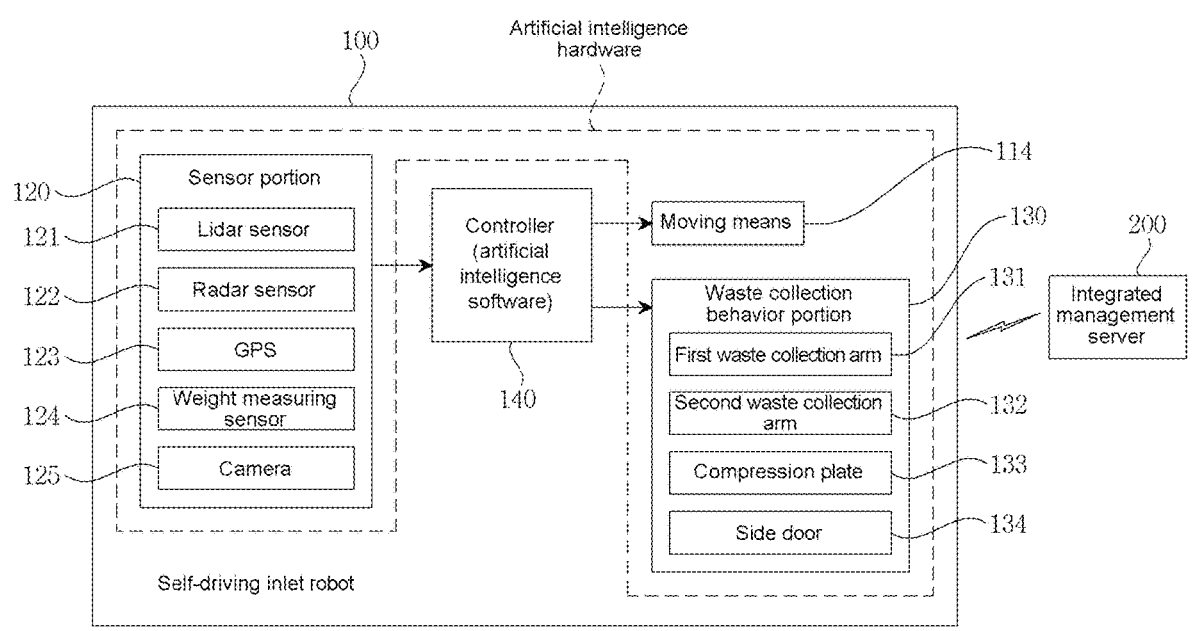
FIG. 1 is a block diagram illustrating a centralized hub system for improving automatic waste transport and collection using a self-driving robot according to an exemplary embodiment of the present disclosure.

The detailed description of the present disclosure will be described below with reference to the accompanying drawings showing specific embodiments in which the present disclosure can be embodied. These embodiments will be described in detail as sufficient as to enable those skilled in the art to practice the invention. It should be understood that the diverse embodiments of the present disclosure do not need to be mutually exclusive although they are different from each other. For example, the specific shapes, structures and characteristics disclosed herein may be implemented in other embodiments in relation to an embodiment without departing from the spirit and scope of the present disclosure. In addition, it should be understood that the positions or arrangements of individual components in each disclosed embodiment can be changed without departing from the spirit and scope of the present disclosure.

Accordingly, the detailed description described below is not intended to be taken as a restrictive meaning, but if it is properly described, the scope of the present disclosure is restricted only by the appended claims, together with all scopes equivalent to the claims. In the drawings, the similar reference symbols refer to the same or similar functions throughout several aspects.

The terms used in the present disclosure have been selected from currently widely used general terms in consideration of the functions in the present disclosure. However, the terms may vary according to the intention of one of ordinary skill in the art, case precedents, and the advent of new technologies. Also, for special cases, meanings of the terms selected by the applicant are described in detail in the description section. Accordingly, the terms used in the present disclosure are defined based on their meanings in relation to the contents discussed throughout the specification, not by their simple meanings.

When a part may "include" a certain constituent element, unless specified otherwise, it may not be construed to exclude another constituent element but may be construed to further include other constituent elements. Terms such as "... unit", "... module", etc. stated in the specification may signify a unit to process at least one function or operation and the unit may be embodied by hardware, software, or a combination of hardware and software.

Referring to FIGS. 1 to 13, a centralized hub system for improving automatic waste transport and collection using a self-driving robot according to an exemplary embodiment of the present disclosure will be described.

First of all, a centralized hub system for improving automatic waste transport and collection using a self-driving robot will be described with reference to FIGS. 1 to 9.

Figure 2:
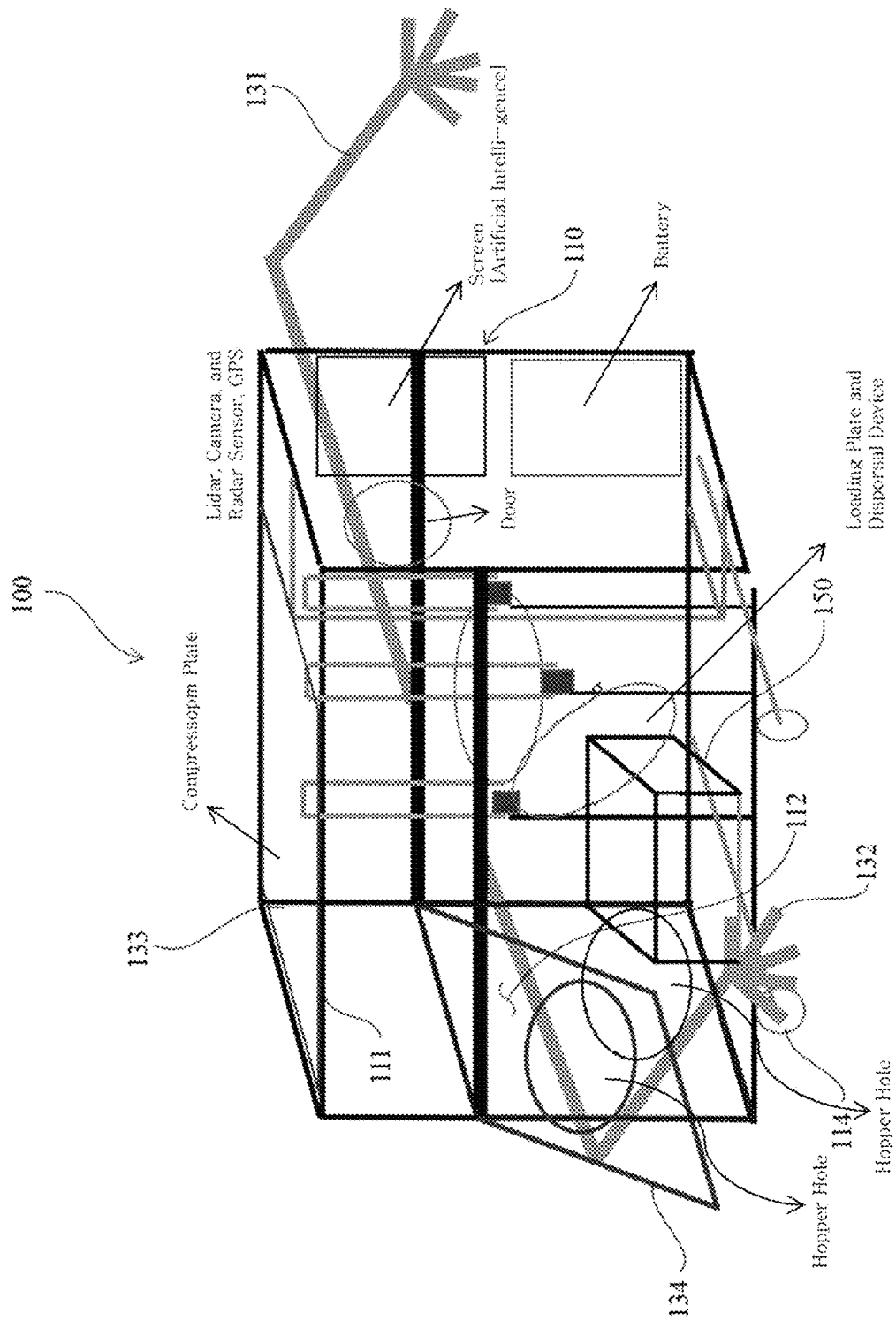
FIGS. 2 to 4 are views illustrating examples of a self-driving inlet robot in a centralized hub system for improving automatic waste transport and collection using a self-driving robot according to an exemplary embodiment of the present disclosure.
Figure 3:
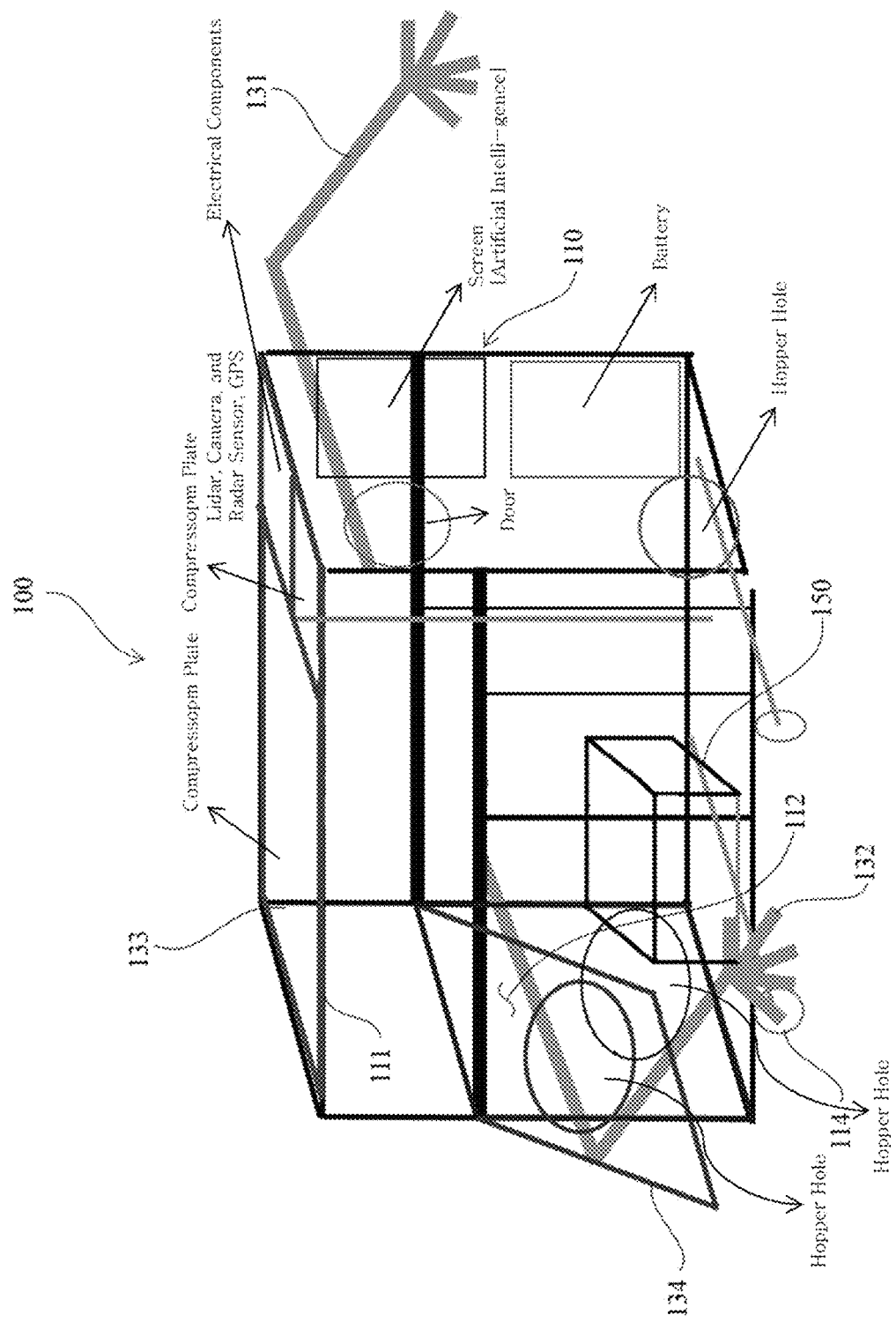
Figure 4:
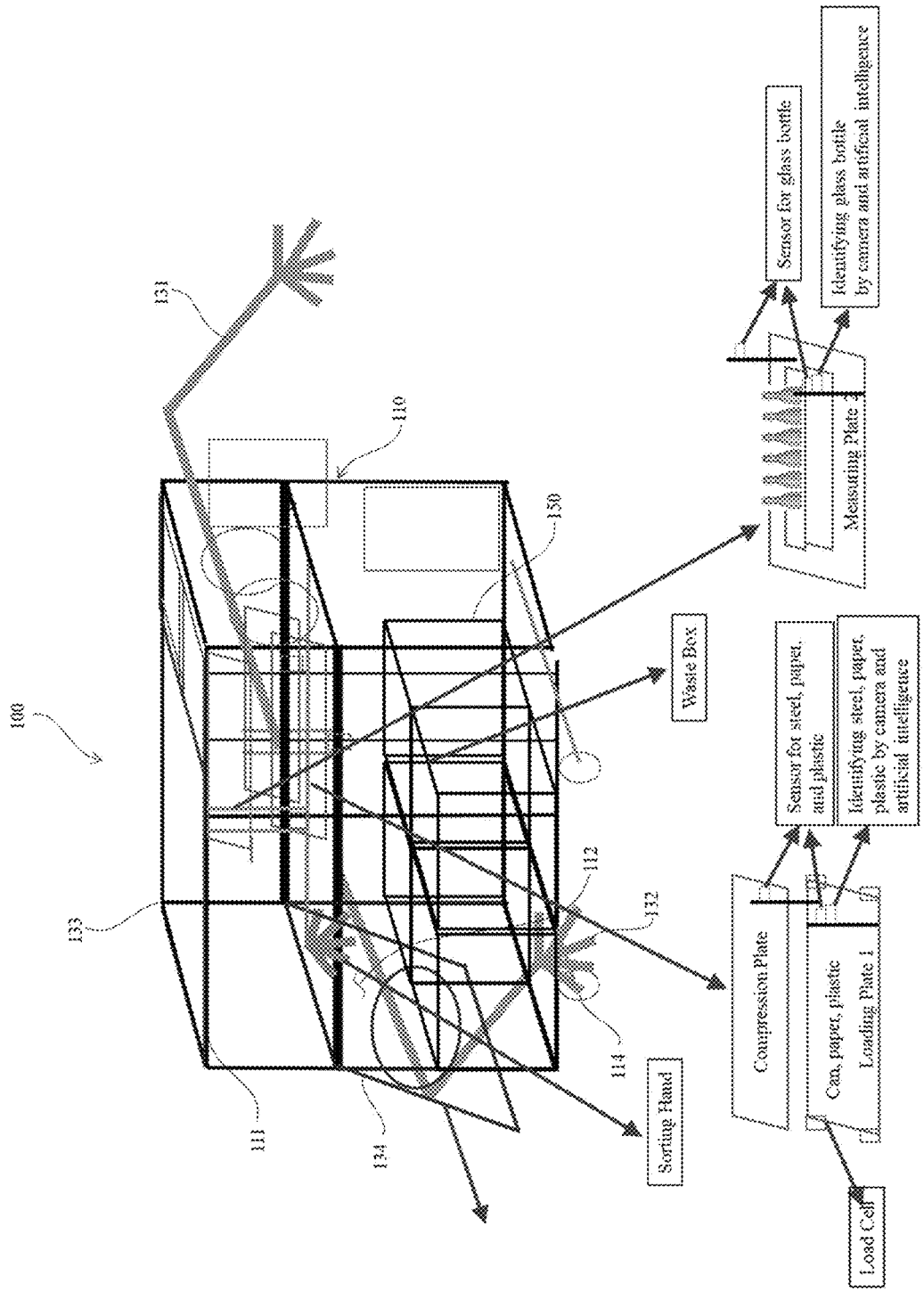
Figure 5:
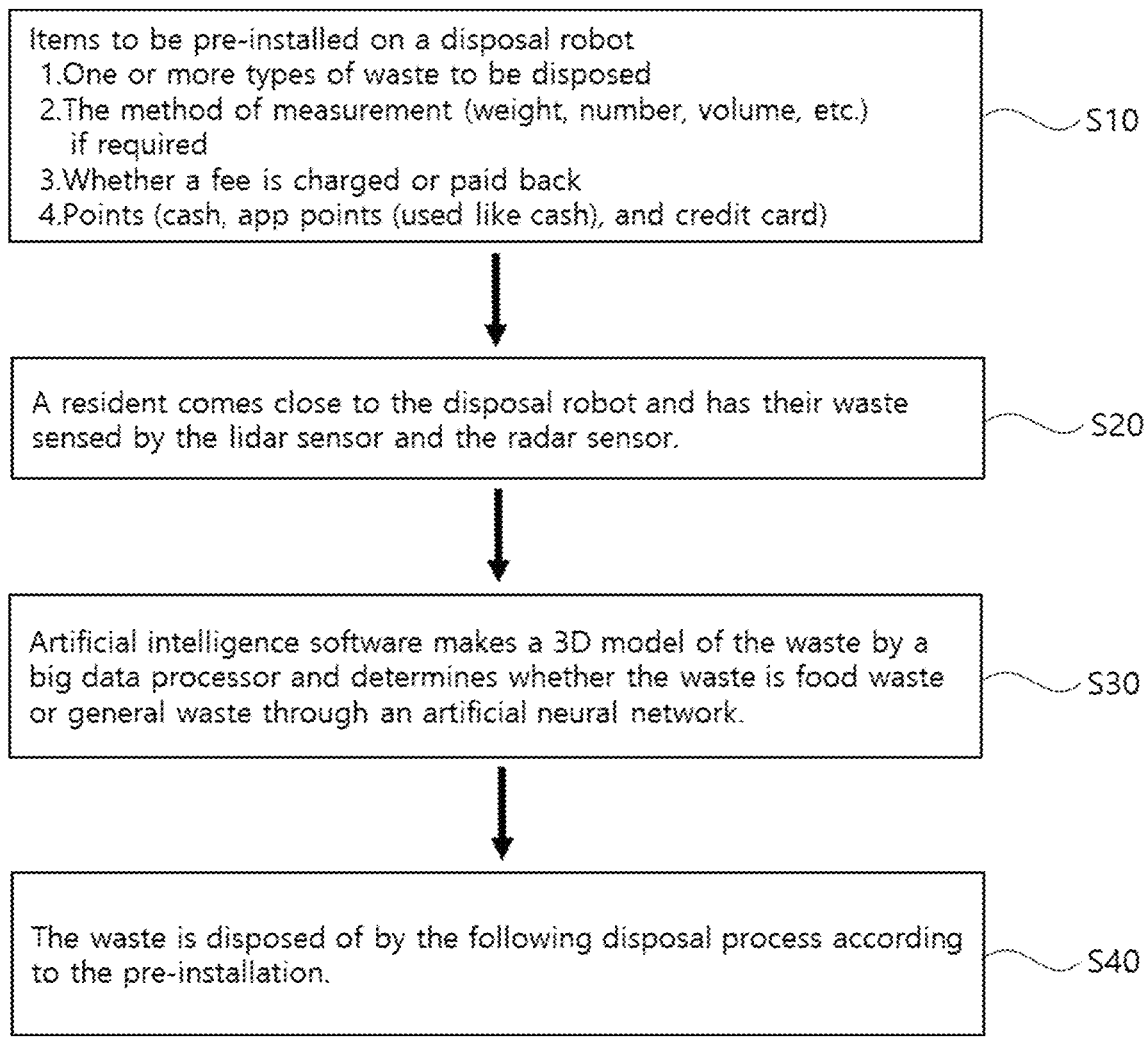
FIG. 5 is a flowchart illustrating a basic process of a self-driving inlet robot in a centralized hub system for improving automatic waste transport and collection using a self-driving robot according to an exemplary embodiment of the present disclosure.
Figure 6:
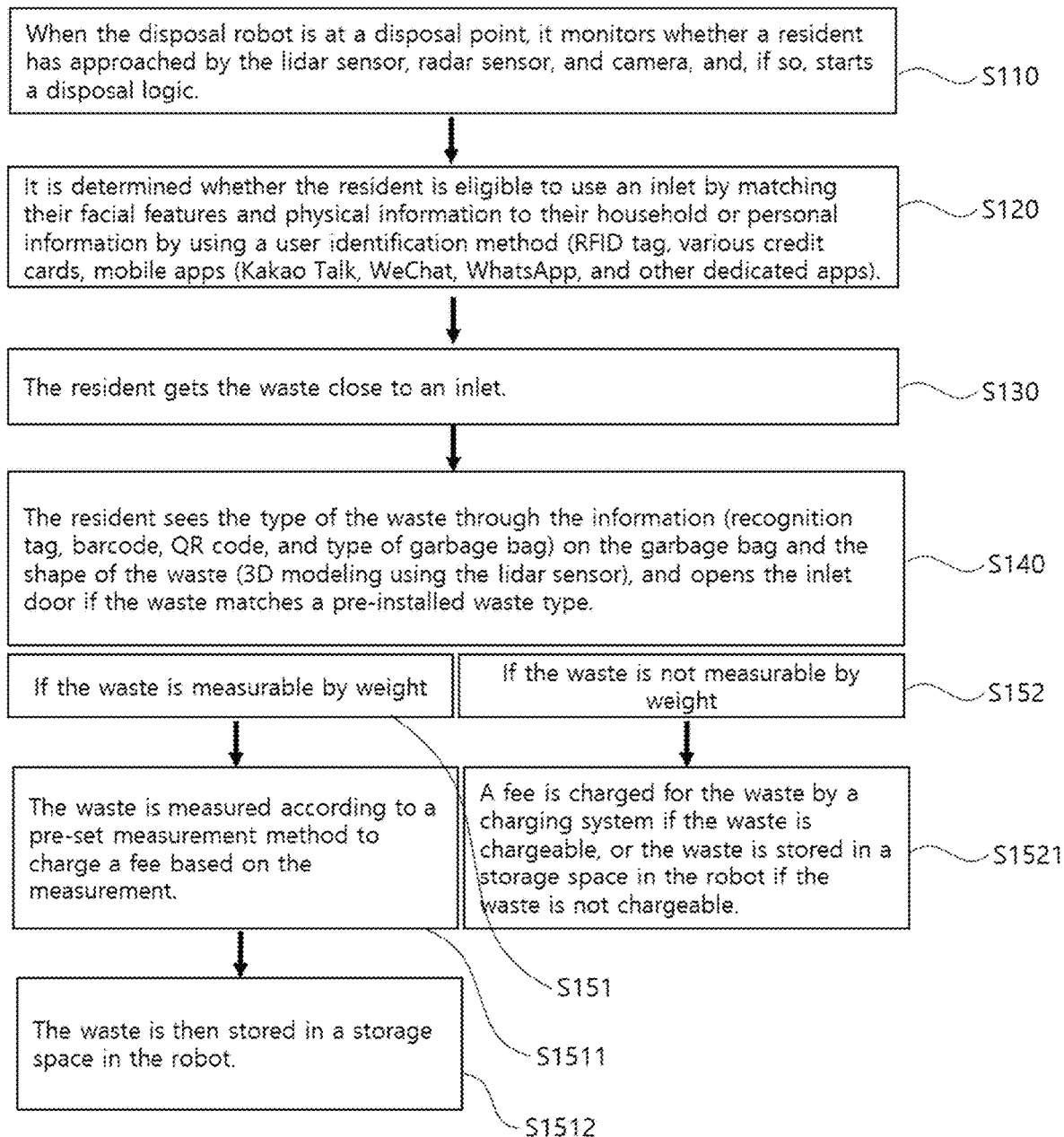
FIGS. 6 to 8 are flowcharts illustrating processes of a self-driving inlet robot in a centralized hub system for improving automatic waste transport and collection using a self-driving robot according to an exemplary embodiment of the present disclosure.
Figure 7:
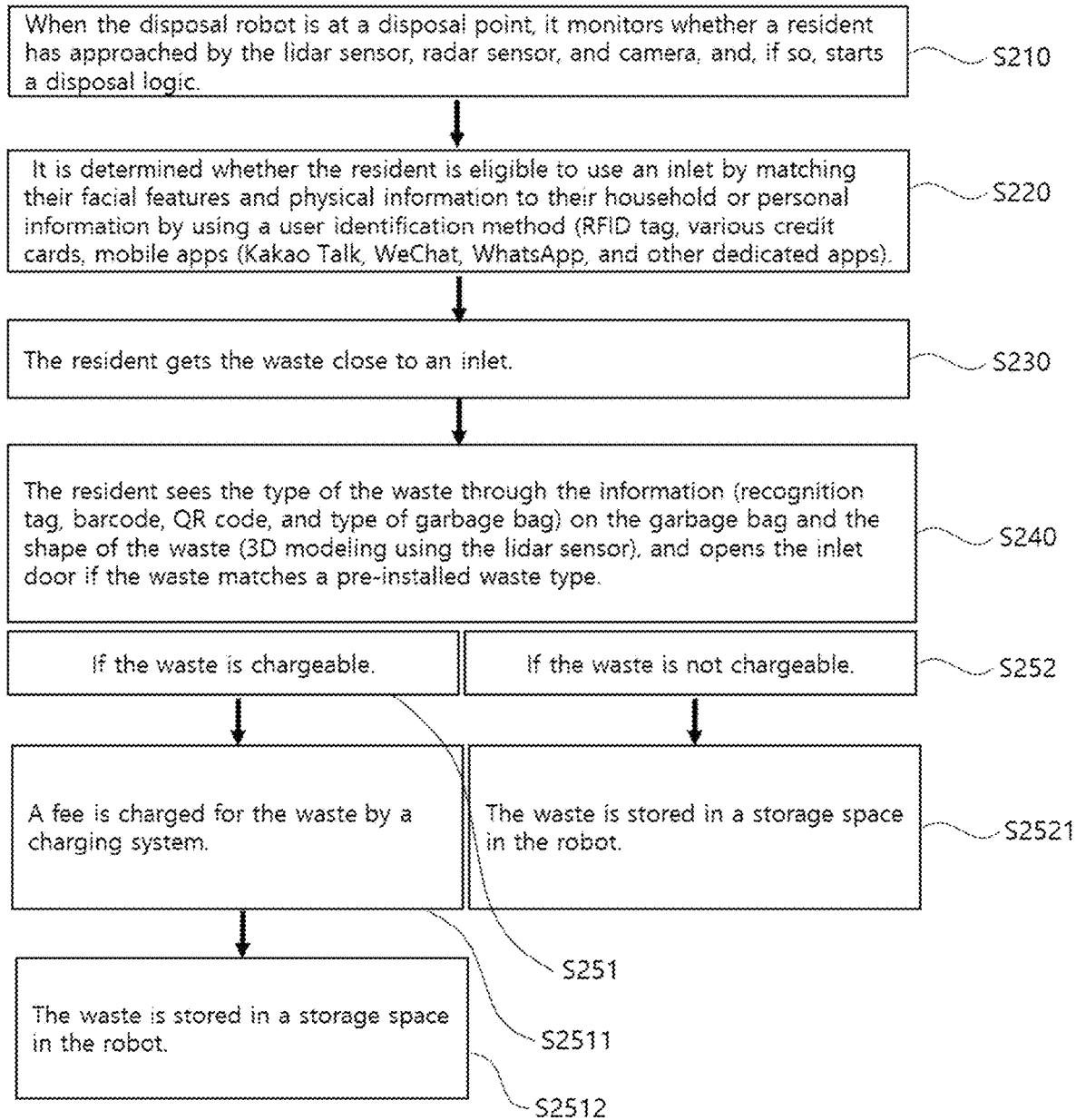
Figure 8:
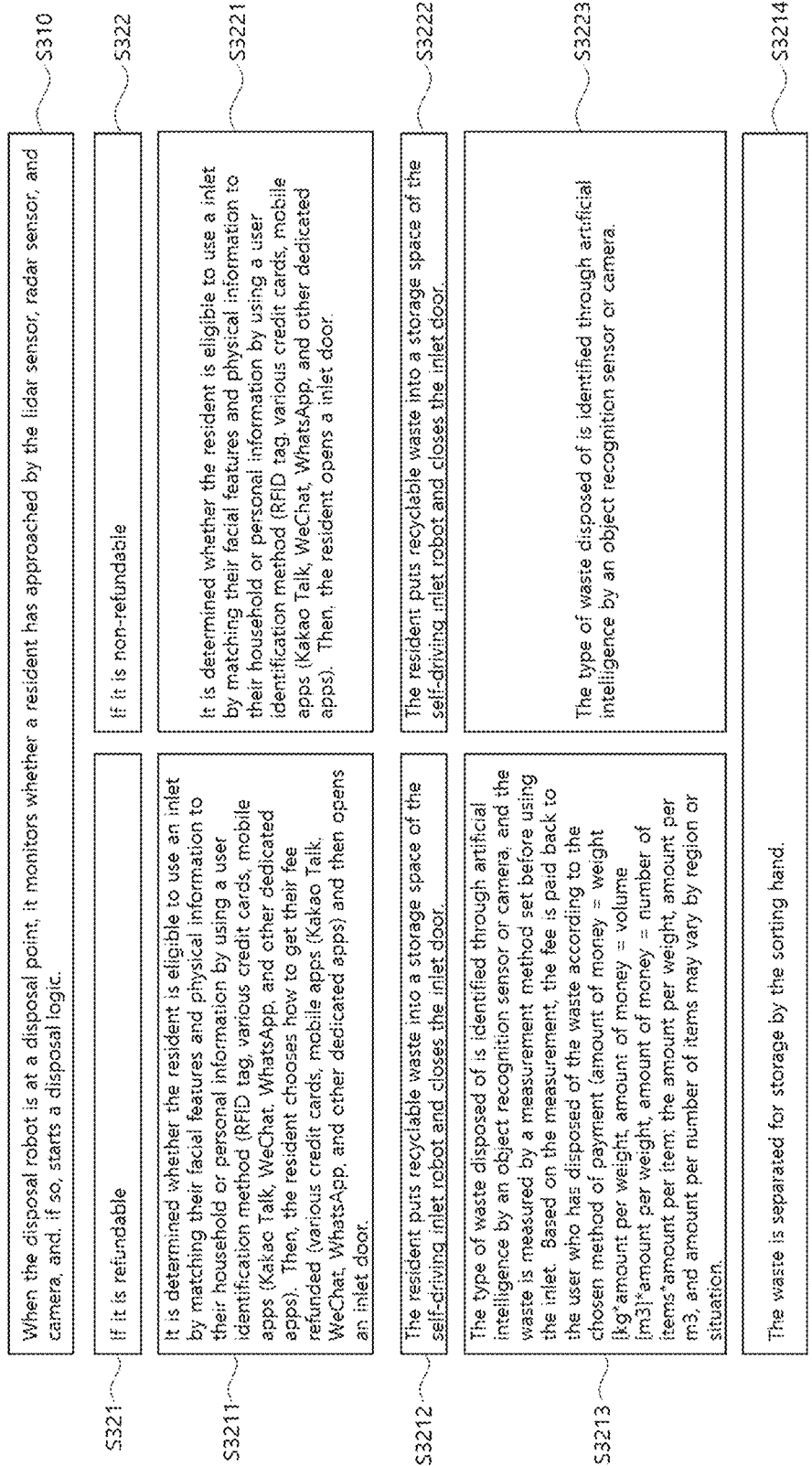
Figure 9:
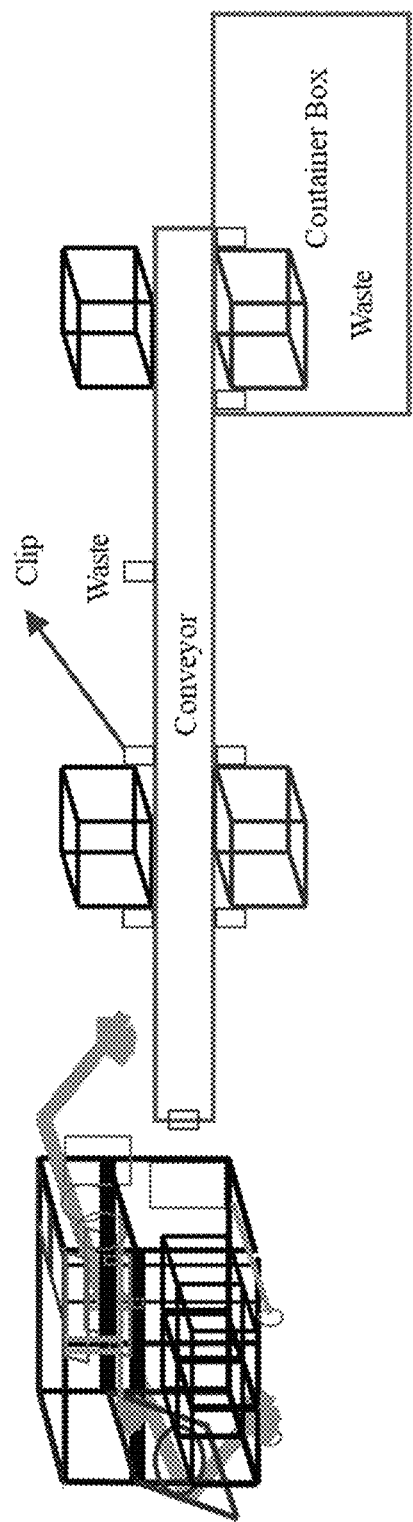
FIG. 9 is a view illustrating an example of waste discharge at a collection point using a self-driving inlet robot, in a centralized hub system for improving automatic waste transport and collection using a self-driving robot according to an exemplary embodiment of the present disclosure.

FIG. 1 is a block diagram illustrating a centralized hub system for improving automatic waste transport and collection using a self-driving robot according to an exemplary embodiment of the present disclosure. FIGS. 2 to 4 are views illustrating examples of a self-driving inlet robot in a centralized hub system for improving automatic waste transport and collection using a self-driving robot according to an exemplary embodiment of the present disclosure. FIG. 5 is a flowchart illustrating a basic process of a self-driving inlet robot in a centralized hub system for improving automatic waste transport and collection using a self-driving robot according to an exemplary embodiment of the present disclosure. FIGS. 6 to 8 are flowcharts illustrating processes of a self-driving inlet robot in a centralized hub system for improving automatic waste transport and collection using a self-driving robot according to an exemplary embodiment of the present disclosure. FIG. 9 is a view illustrating an example of waste discharge at a collection point using a self-driving inlet robot, in a centralized hub system for improving automatic waste transport and collection using a self-driving robot according to an exemplary embodiment of the present disclosure.

As shown in the drawings, a centralized hub system for improving automatic waste transport and collection using a self-driving robot according to an exemplary embodiment of the present disclosure comprises self-driving inlet robots 100 and an integrated management server 200.

The self-driving inlet robots 100 each comprise a body portion 110, a sensor portion 120, a waste collection behavior portion 130, and a controller 140.

The body portion 110 is formed with at least one between a top inlet 111 and side inlet 112 for receiving waste and a first outlet (not shown) for discharging waste. The body portion 110 comprises a moving means 114.

The sensor portion 120 comprises a lidar sensor 121, a radar sensor 122, a GPS 123, and a weight measuring sensor 124 that are mounted to the body portion 110.

The waste collection behavior portion 130 comprises a first waste collection arm 131 and second waste collection arm 132 that are mounted to the body portion 110 and grip waste and put it into the top inlet 111 and side inlet 112 of the body portion 110, respectively, a compression plate 133 that opens and closes the top inlet 111 of the body portion 111 and compresses the waste in the body portion 110 by vertical movement, and a side door 134 rotatably mounted to the body portion 110 so as to open and close the side inlet 112 of the body portion 110.

The controller 140 controls the operations of each component of the waste collection behavior portion 130 and the moving means of the body portion 110 based on a signal sensed by the sensor portion 120 and a preset control program. Also, the controller 140 presets a capacity limit for the waste stored in the body portion 110 and controls the moving means 114 in such a way as to enable self-driving to a pre-designated waste disposal site if the amount of waste disposed into the body portion 110 is higher than the capacity limit.

The integrated management server 200 is web-based, and this integrated management server 200 receives, stores, and manages at least one among user identification information, waste type information, waste measurement information, charging information, and payback information transmitted from the self-driving inlet robots 100. The integrated management server 200 is installed in a pre-designated place where the self-driving inlet robots 100 gather together.

Moreover, the self-driving inlet robots 100 operate as either a first type which makes a measurement on a waste item based on either weight, volume, or number and then charges a fee or not based on the measurement information, or a second type which makes a measurement on a recyclable waste item based on either weight, volume, or number and then pays back a fee or not based on the measurement information.

More specifically, the self-driving inlet robots 100 may collect many types of waste, such as food waste (including animal and plant waste and carcass), general (domestic) waste, recyclable waste (including glass bottles, cans, paper, plastics, etc.), industrial waste (including wastewater, inorganic and organic matters, etc.), and other waste. Basically, the self-driving inlet robots 100 collect waste separately by type or collects only one type of waste, but, in some cases, may collect food waste and general waste together. Also, in order to collect waste separately by type, the self-driving inlet robots 100 are equipped with the same number of waste storage boxes 150 as the types of waste to be collected. In this case, the waste collection behavior portion 130 needs to be fitted with a first waste collection arm 131 and a second waste collection arm 132.

Depending on the amount of each type of recyclable waste, waste storage boxes 150 for recyclable waste may be divided into a glass bottle box, a paper box, a plastic box, and a can box, or may be otherwise divided into a glass bottle box and a paper box or into a glass bottle box and a can box. Also, different types of waste storage boxes 150 are used depending on the amount of each type of recyclable waste.

Moreover, all of the self-driving inlet robots 100 gather in a web-based integrated management server 200, and each self-driving inlet robot 100 transmits user identification information, waste type, waste measurements (kg, M3, number, etc.) if required, rate charged, and amount of money paid back to the integrated management server 200, and the integrated management server 200 stores all the data transmitted from the self-driving inlet robots 100 in a data server.

The data stored in the data server of the integrated management server 200 is used as base data for the efficient operation of future waste policies, the self-driving inlet robots 100, collection points, disposal systems, and an self-driving vehicle robot 300 (see FIG. 10) of another exemplary embodiment to be described later.

The self-driving inlet robots 100 basically use UDP/TCP as a communication protocol with the integrated management server 200, and also may use a modem or the like.

The integrated management server 200 may use software such as Python, Java, C, C++, MFC, C#, etc., and communicates with mobiles apps (Kakao Talk, Line, WeChat, WhatsApp, etc.) and devices on the self-driving inlet robots 100, such as telephones, modems, etc.

Hardware for the integrated management server 200 is configured to run 24 hours for 365 days for 5 or more years and store data for 5 or more years.

A more detailed description will be given with reference to FIGS. 2 to 4. FIG. 2 illustrates how a self-driving inlet robot works for a type of waste for which a fee is charged based on a measurement. FIG. 3 illustrates how a self-driving inlet robot works for a type of waste for which no fee is charged based on a measurement. FIG. 4 illustrates how a self-driving inlet robot works for a type of waste whose fee is paid back based on a measurement.

Next, an operational process of a centralized hub system for improving automatic waste transport and collection using a self-driving robot according to this exemplary embodiment will be described.

The centralized hub system for improving automatic waste transport and collection using a self-driving robot according to this exemplary embodiment is set up in densely populated areas, such as apartment complexes, residential neighborhoods, shopping districts, and streets, and areas with a floating population, and the ECC of the integrated management server 200 and the self-driving inlet robot 100 communicate with each other in real time to have the system on standby.

The self-driving inlet robot 100 may operate differently for a type of waste for which a fee is charged based on a measurement, a type of waste for which no fee is charged based on a measurement, and a type of waste whose fee is paid back based on a measurement.

For the type of waste for which a fee is charged based on a measurement, the user has to set 1 or more types of waste to be collected and whether to use a waste storage box 150 or not before use, and at the same time the user has to set up the first waste collection arm 131 and the second waste collection arm 132 when using the waste storage box 150 and set one or more methods of measurement. Also, one of the disposal processes according to FIGS. 5 to 7 needs to be set before use.

For the type of waste for which no fee is charged based on a measurement, the user has to set 1 or more types of waste to be collected and whether to use a waste storage box 150 or not before use, and at the same time the user has to set up the first waste collection arm 131 and the second waste collection arm 132 when using the waste storage box 150. Also, one of the disposal processes according to FIGS. 5 to 7 needs to be set before use.

For the type of waste whose fee is paid back based on a measurement, a user has to set 1 or more types of waste to be collected and the presence or absence of a waste storage box 150 before use, and at the same time the user has to set up the first waste collection arm 131 and the second waste collection arm 132 when using the waste storage box 150 and set one or more methods of measurement. Also, one of the disposal processes according to FIGS. 6 to 8 needs to be set before use.

A number of self-driving inlet robots 100 may be run to collect the same type of waste in one place or collect different types of waste.

Next, the movement of a self-driving inlet robot 100 to a collection point will be described.

The self-driving inlet robot 100 transmits a waste disposal state in real time to the ECC of the integrated management server 200, and, once the amount of waste disposal reaches a preset capacity limit, receives permission to move to a collection point from the ECC of the integrated management server 200 and then self-drives to the collection point. In this case, the self-driving inlet robot 100 transmits its self-driving state and surrounding state during a self-driving movement to the ECC of the integrated management server 200.

The ECC of the integrated management server 200 monitors the waste disposal state, location, moving state, and surrounding state of every self-driving inlet robot 100, determines the volume of surrounding traffic and the movement of people to avoid rush hours, and determines the state of the collection point to give the self-driving inlet robots a command to move sequentially to the collection point.

Moreover, the self-driving inlet robot 100 avoids obstacles itself on its own judgment while moving to the collection point, and, if there is people ahead on a sidewalk or crosswalk, moves to the collection point on its own judgement, making safety the first priority.

Next, the waste discharge of the self-driving inlet robot 100 at the collection point will be described.

The self-driving inlet robot 100 connects the side inlet 112 of the body portion 110 and a waste collecting container in the collection point by a hopper and then vacuum-discharges waste by running a fan.

Moreover, the self-driving inlet robot 100 may open the backside and discharge waste in a temporary waste collection box, transfer waste from the temporary collection box to the container by running a fan through a hopper connected between the temporary collection box and the container. The temporary waste collection box may be set up higher than the container, and waste may be transferred to the container by a free fall caused by the weight of the waste.

As shown in FIG. 9, a conveyor may be used. Waste is placed on a running conveyor and discharged to the conveyor. The conveyor is connected to the container's entrance through an open space at the back of the self-driving inlet robot 100 by a waste collection arm, sorting hand, gripping hand (which recognizes an object by a camera and uses artificial intelligence), and other methods. The conveyor has a clip for securing the waste storage box 150, and the position of the clip may be changed depending on the size of the waste storage box 150. Once the self-driving inlet robot 100 places the waste storage box 150 on a running conveyor, the waste storage box 150 is secured with the clip and discharges waste to the container, and then waste storage box 150 is retrieved.

The waste discharge method for the self-driving inlet robot 100 may be set before use depending on the type of waste, and the self-driving inlet robot 100 may discharge waste on its own judgment.

More specifically, the sorting hand is configured to move up and down and left and right, and is optimized for moving an object because it has joints. Whether to set up the sorting hand or not is determined by the shape of a waste item, the waste policies, and the presence or absence of a waste storage box. If the amount of waste disposed into the container is above a designed storage capacity, the waste is discharged back through a vehicle.

Next, a basic process and measurement method of a self-driving inlet robot in a centralized hub system for improving automatic waste transport and collection using a self-driving robot according to an exemplary embodiment of the present disclosure will be described with reference to FIG. 5.

As shown in the drawing, in the step S10, items to be pre-installed on the self-driving inlet robot 100 include one or more types of waste to be disposed of, the method of measurement (weight, number, volume, etc.) if required, whether a fee is charged or paid back, and points (cash, app points (used like cash) and credit card).

In the step S20, a resident may come close to the self-driving inlet robot 100 and have their waste sensed by the lidar sensor 121 and the radar sensor 122.

In the step S30, artificial intelligence software makes a 3D model of the waste by a big data processor and determines whether the waste is food waste or general waste through an artificial neural network.

In the step S40, the waste is disposed of by the disposal process of FIGS. 6 to 8 to be explained below according to the pre-installation.

Next, processes of a self-driving inlet robot in a centralized hub system for improving automatic waste transport and collection using a self-driving robot according to an exemplary embodiment of the present disclosure will be described with reference to FIGS. 6 to 8.

First of all, FIG. 6 illustrates a process for a type of waste for which a fee is charged based on a measurement.

As shown in the drawing, in the step S110, when the self-driving inlet robot 100 is at a disposal point, it monitors whether a resident has approached by the lidar sensor 121, radar sensor 122, and camera 125, and, if so, starts a disposal logic.

In the step S120, it is determined whether the resident is eligible to use a inlet by matching their facial features and physical information to their household or personal information by using a user identification method (RFID tag, various credit cards, mobile apps (Kakao Talk, WeChat, WhatsApp, and other dedicated apps).

In the step S130, the resident gets the waste close to a inlet.

In the step S140, the resident sees the type of the waste through the information (recognition tag, barcode, QR code, and type of garbage bag) on the garbage bag and the shape of the waste (3D modeling using the lidar sensor), and opens the inlet door (compression plate or side door) if the waste matches a pre-installed waste type.

If the waste is deemed measurable in the step S151, the waste is measured according to a pre-set measurement method to charge a fee based on the measurement in the step S1511, and the waste is then stored in a storage space in the self-driving inlet robot 100 in the step S1512.

On the other hand, if the waste is deemed not measurable in the step S152, a fee is charged for the waste by a charging system if the waste is chargeable, or the waste is stored in a storage space in the self-driving inlet robot 100 if the waste is not chargeable in the step S1521.

FIG. 7 illustrates a process for a type of waste for which no fee is charged based on a measurement.

As shown in the drawing, in the step S210, when the self-driving inlet robot 100 is at a disposal point, it monitors whether a resident has approached by the lidar sensor 121, radar sensor 122, and camera 125, and, if so, starts a disposal logic.

In the step S220, it is determined whether the resident is eligible to use an inlet by matching their facial features and physical information to their household or personal information by using a user identification method (RFID tag, various credit cards, mobile apps (Kakao Talk, WeChat, WhatsApp, and other dedicated apps).

In the step S230, the resident gets the waste close to an inlet.

In the step S240, the resident sees the type of the waste through the information (recognition tag, barcode, QR code, type of garbage bag, shape of waste) on the garbage bag and the shape of the waste (3D modeling using the lidar sensor), and opens the inlet door (compression plate or side door) if the waste matches a pre-installed waste type.

If the waste is deemed chargeable in the step S251, a fee is charged for the waste by a charging system in the step S2511, and the waste is stored in a storage space in the self-driving inlet robot 100 in the step S2512.

On the other hand, if the waste is deemed not chargeable in the step S252, the waste is stored in a storage space in the self-driving inlet robot 100 in the step S2521.

FIG. 8 illustrates a process for a type of waste whose fee is paid back based on a measurement.

As shown in the drawing, in the step S310, when the self-driving inlet robot 100 is at a disposal point, it monitors whether a resident has approached by the lidar sensor 121, radar sensor 122, and camera 125, and, if so, starts a disposal logic.

If the waste is deemed refundable in the step S321, it is determined in the step S3211 whether the resident is eligible to use an inlet by matching their facial features and physical information to their household or personal information by using a user identification method (RFID tag, various credit cards, mobile apps (Kakao Talk, WeChat, WhatsApp, and other dedicated apps). Then, the resident chooses how to get their fee refunded (various credit cards, mobile apps (Kakao Talk, WeChat, WhatsApp, and other dedicated apps) and then opens an inlet door (compression plate or side door).

In the step S3212, the resident puts recyclable waste into a storage space of the self-driving inlet robot and closes the inlet door.

In the step S3213, the type of waste disposed of is identified through artificial intelligence by an object recognition sensor or camera, and the waste is measured by a measurement method set before using the inlet. Based on the measurement, the fee is paid back to the user who has disposed of the waste according to the chosen method of payment (amount of money=weight [kg*amount per weight, amount of money=volume [m3]*amount per weight, amount of money=number of items*amount per item; the amount per weight, amount per m3, and amount per number of items may vary by region or situation.

In the step S3214, the waste is separated for storage by the sorting hand.

If the waste is deemed non-refundable in the step S322, it is determined in the step S3221 whether the resident is eligible to use an inlet by matching their facial features and physical information to their household or personal information by using a user identification method (RFID tag, various credit cards, mobile apps (Kakao Talk, WeChat, WhatsApp, and other dedicated apps). Then, the resident opens an inlet door (compression plate or side door).

In the step S3222, the resident puts recyclable waste into a storage space of the self-driving inlet robot and closes the inlet door.

In the step S3223, the type of waste disposed of is identified through artificial intelligence by an object recognition sensor or camera.

Subsequently, the process proceeds to the aforementioned step S3214.

The method of measurement is selected from among weight measurement, volume measurement, number measurement, and other methods of measurement, and then optional construction equipment is manufactured on the self-driving inlet robot 100, a visiting disposal robot, etc.

The equipment assembly for the method of weight measurement includes a load cell, a loading plate, an A/D converter, and a mainboard (control). A process for this method involves checking the zero points of the mainboard and load cell, placing waste on the loading plate, checking for stable signals of the mainboard and load cell, and then reading the weight from the mainboard, and charging a fee, paying back a fee, or taking other measures based on the measurement.

The equipment assembly for the method of volume measurement includes a loading plate, a compression plate, a sorting hand, an encoder (compression plate measurement), and an encoder zero-point sensor. A process for this method involves resetting the encoder by the encoder zero-point sensor, placing waste on the loading plate and spreading the waste widely by the sorting hand, compressing the waste against the compression plate, calculating the compression distance of the compression plate, calculating the volume (M3), and charging a fee, paying back a fee, or taking other measures based on the measurement.

The equipment assembly for the method of number measurement includes various object sensors, a camera (for sensing an object through artificial intelligence), a conveyor, and others. A process for this method involves placing objects (glass bottles, cans, etc.) on a loading plate, identifying the objects through the various object sensors and artificial intelligence and counting the number of objects, and charging a fee, paying back a fee, or taking other measures based on the counted number.

Next, a centralized hub system for improving automatic waste transport and collection using a self-driving robot according to another exemplary embodiment of the present disclosure will be described with reference to FIGS. 10 to 13.

Figure 10:
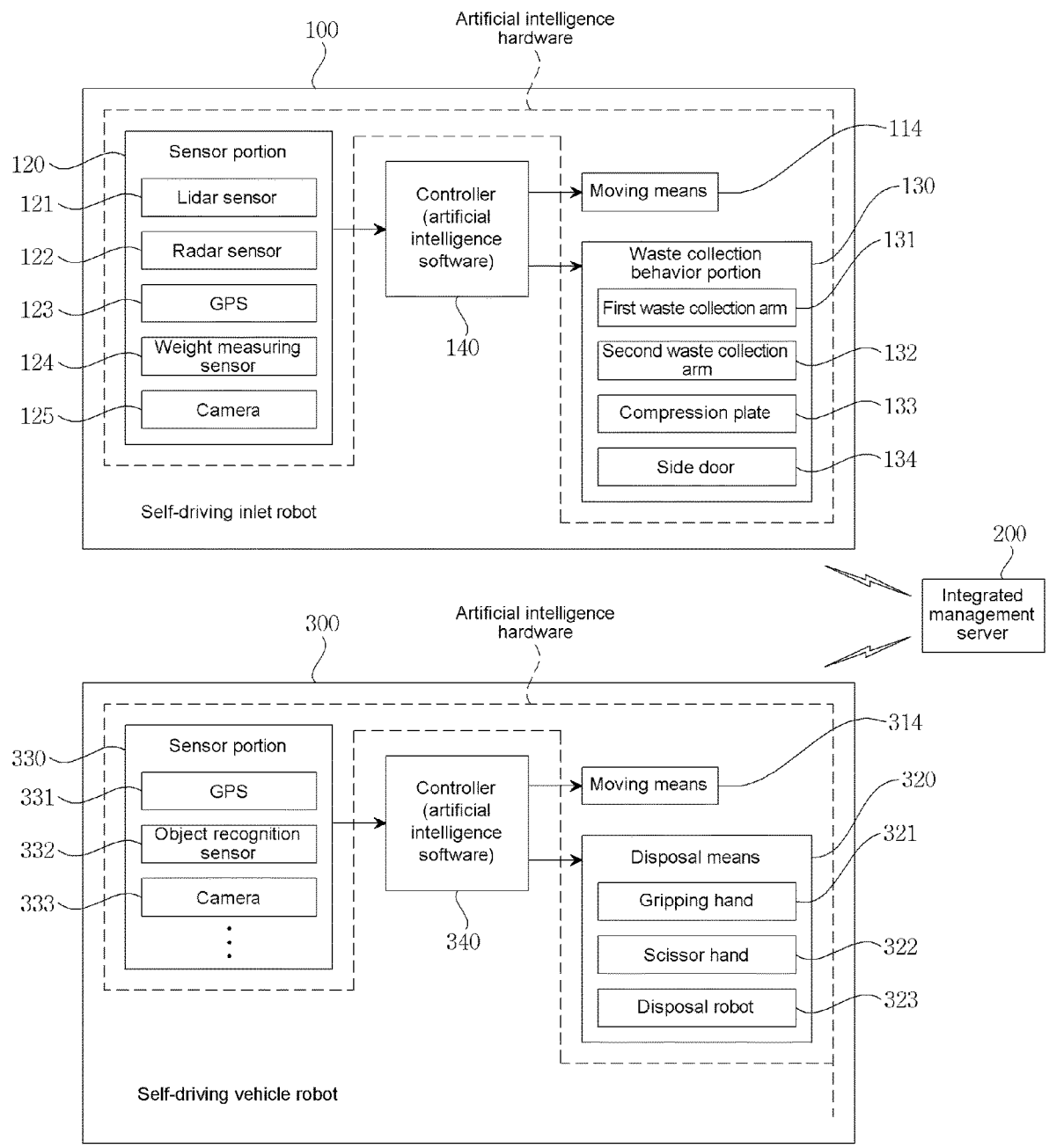
FIG. 10 is a block diagram illustrating a centralized hub system for improving automatic waste transport and collection using a self-driving robot according to another exemplary embodiment of the present disclosure.
Figure 11:
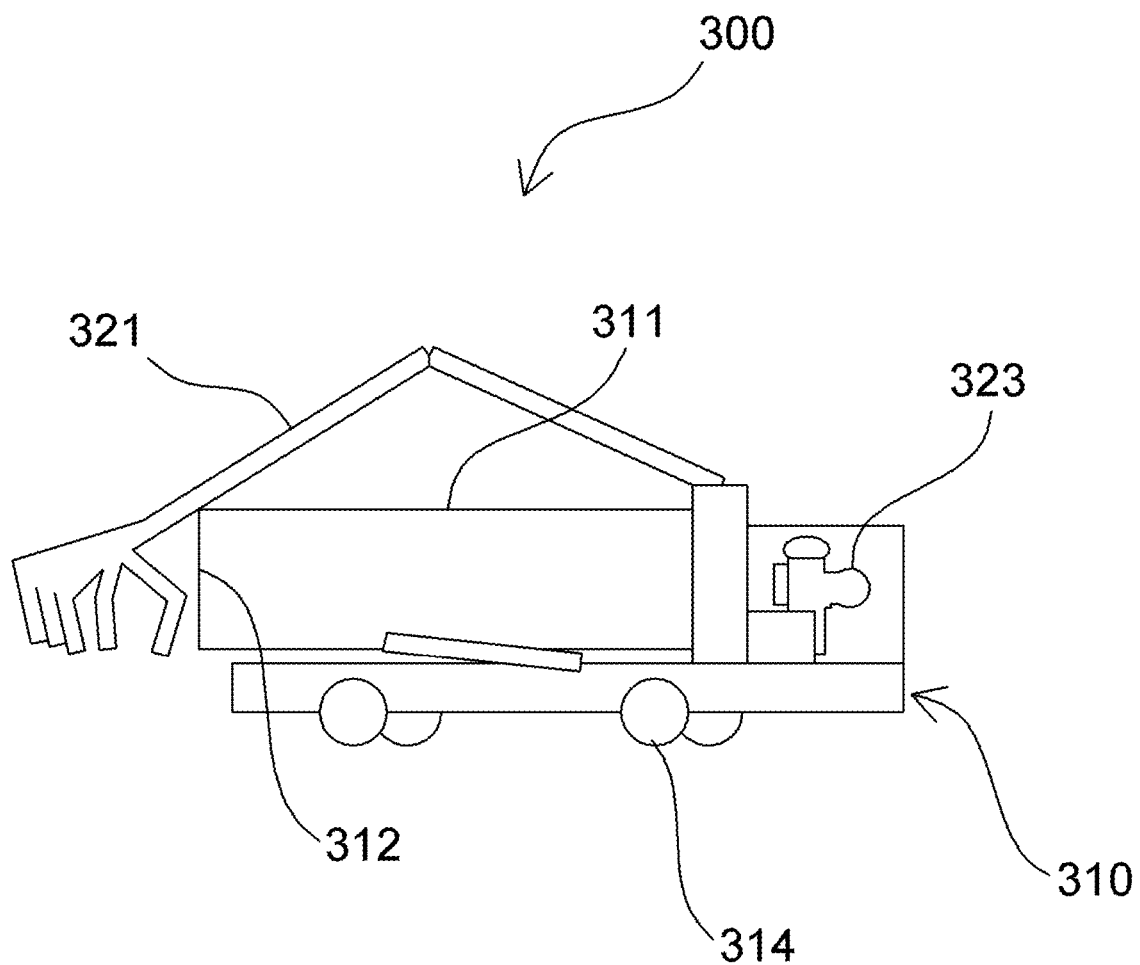
FIGS. 11 to 13 are views illustrating examples of a self-driving vehicle robot in a centralized hub system for improving automatic waste transport and collection using a self-driving robot according to another exemplary embodiment of the present disclosure.
Figure 12:
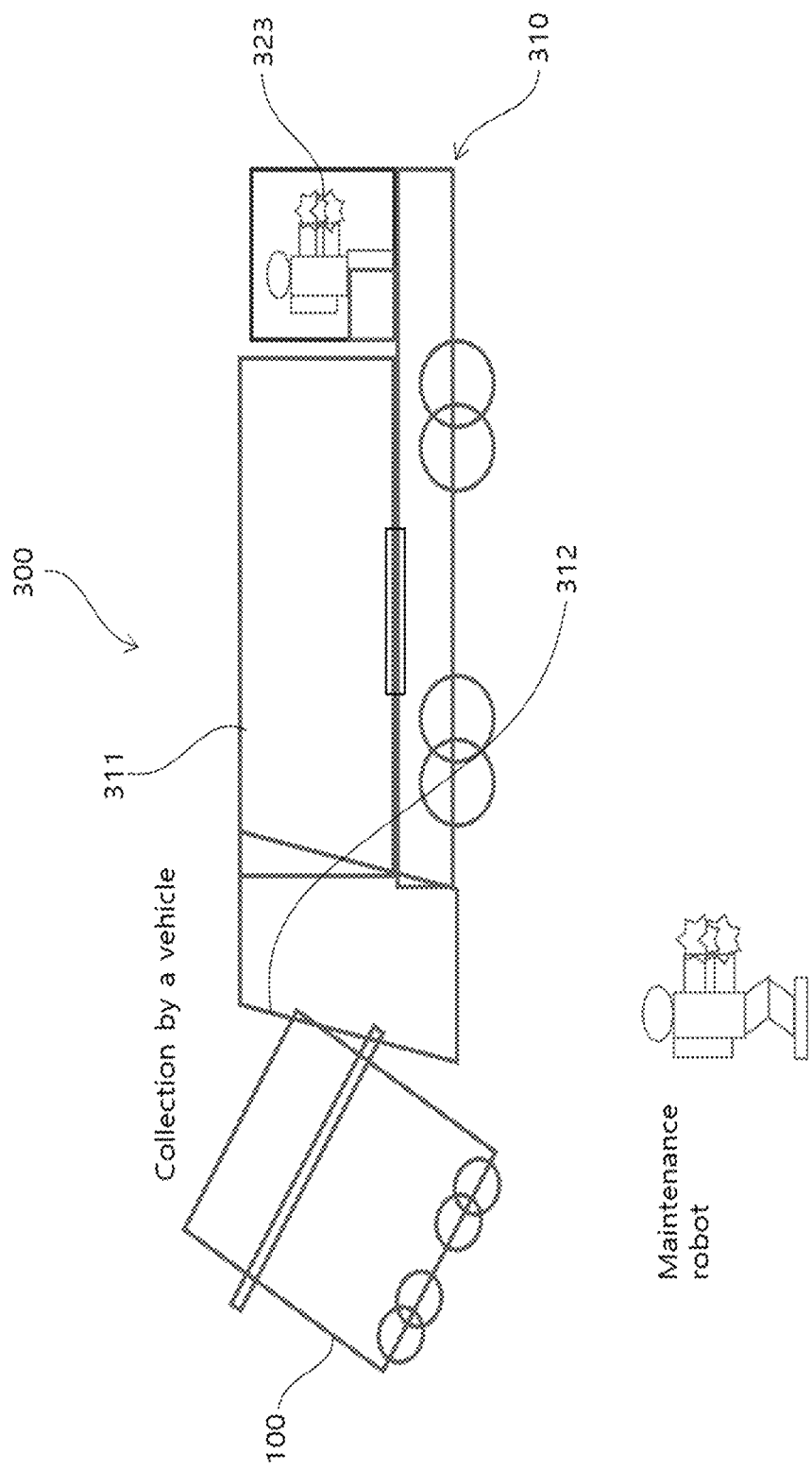
Figure 13:
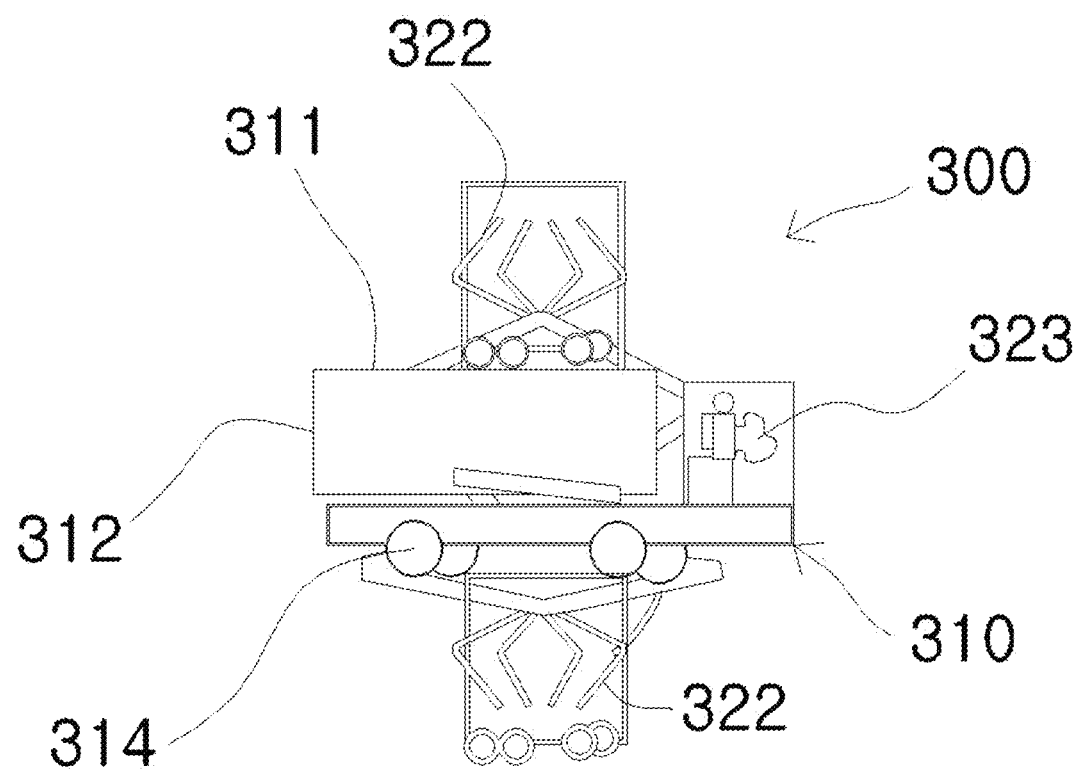

FIG. 10 is a block diagram illustrating a centralized hub system for improving automatic waste transport and collection using a self-driving robot according to another exemplary embodiment of the present disclosure. FIGS. 11 to 13 are views illustrating examples of a self-driving vehicle robot in a centralized hub system for improving automatic waste transport and collection using a self-driving robot according to another exemplary embodiment of the present disclosure.

As shown in the drawings, the centralized hub system for improving automatic waste transport and collection using a self-driving robot according to another exemplary embodiment of the present disclosure further comprises a self-driving vehicle robot 300, as compared to the centralized hub system for improving automatic waste transport and collection using a self-driving robot according to the exemplary embodiment of the present disclosure shown in FIGS. 1 to 9.

That is, the self-driving inlet robot 100 and integrated management server 200 in the centralized hub system for improving automatic waste transport and collection using a self-driving robot according to this exemplary embodiment of the present disclosure are identical to the corresponding components in the centralized hub system for improving automatic waste transport and collection using a self-driving robot according to the exemplary embodiment shown in FIGS. 1 to 9. Accordingly, the following description will be given with respect to the self-driving vehicle robot 300.

The self-driving vehicle robot 300 comprises a driving body portion 310, a disposal means 320, a sensing portion 330, and a controller 340.

The driving body portion 310 comprises a first inlet 311 on the top and a second inlet 312 on the side, which are for putting waste in, a second outlet (not shown) for discharging waste, and a transportation device 314.

The disposal means 320 is mounted to the driving body portion 310, and functions to put the waste stored in the self-driving inlet robot 100 into the driving body portion 310.

The sensing portion 330 comprises a GPS 331 for self-driving and other sensors, and is mounted to the driving body portion 310.

The controller 340 controls the operations of the transportation device 314 of the driving body portion 310 and the disposal means 320, based on a signal sensed by the sensing portion 330 and a preset driving program.

The self-driving vehicle robot 300 with the above-described configuration self-drives to the self-driving inlet robots 100, collects waste, and self-drives and returns to a pre-designated waste disposal site, in response to an operation request signal received from the outside or on a preset self-driving cycle.

More specifically, when the user calls the self-driving vehicle robot 300 by equipping user recognition information and location via wired and wireless communications such as a dedicated app, Kakao Talk, WeChat, WhatsApp, CDMA, etc., it may move to where the user is located, collect waste, and put the waste into the self-driving inlet robot 100.

The self-driving vehicle robot 300 may operate as either a type that charges a fee based on a measurement, a type that charges no fee based on a measurement, and a type that pays back a fee based on a measurement. Also, it may come in the shape of a human figure.

The self-driving vehicle robot 300 is able to chat with the user about information on the waste, and may receive this information from the user via wired and wireless communications such as a dedicated app, Kakao Talk, WeChat, WhatsApp, CDMA, etc.

The self-driving vehicle robot 300 monitors the waste disposal state, location, moving state, and surrounding state of every corresponding self-driving inlet robot 100, determines the volume of surrounding traffic and the movement of people to avoid rush hours, and determines the state of the self-driving inlet robots 100 to move sequentially to the self-driving inlet robots 100 and collect the waste loaded in the self-driving inlet robots 100. The self-driving vehicle robot 300 avoids obstacles itself on its own judgment while moving and, if there is people ahead on a sidewalk or crosswalk, moves to the self-driving inlet robots 100 on its own judgement, making safety the first priority. Also, the self-driving vehicle robot 300 collects waste basically on a periodical basis, and determines whether to collect waste urgently or not and when to collect waste urgently by detecting the states of the inlets.

Collection methods for the self-driving vehicle robot 300 will now be described. In the first method, the waste in the self-driving inlet robot 100 or waste piled up or dumped on a street, sidewalk, or other places is recognized by the object recognition sensor and camera of the self-driving vehicle robot 300 and then collected by a gripping hand 321 which operates autonomously through artificial intelligence.

In the second method, the waste in the self-driving inlet robot 100 or waste piled up or dumped on a street, sidewalk, or other places is recognized by the object recognition sensor and camera of the self-driving vehicle robot 300 and then collected by a scissor hand 322 which operates autonomously through artificial intelligence.

In the third method, when the self-driving vehicle robot 300 comes near the self-driving inlet robot 100, a disposal robot 323 of the self-driving vehicle robot 300 moves toward a lift of the self-driving vehicle robot 300. The lift of the self-driving vehicle robot 300 secures the disposal robot 323 with a clip, and empties the loaded waste from the self-driving inlet robot 100 by hanging the disposal robot 323 upside down and goes back to the original position. The lift of the self-driving vehicle robot 300 operates autonomously by recognizing waste by the object recognition sensor and camera through artificial intelligence.

In a case where the waste storage box 150 is applied to the self-driving inlet robot 100, the back of the self-driving inlet robot 100 is opened by a robotic hand, and the waste storage box 150 is separated out from the self-driving inlet robot 100 by a recyclable sorting hand or arm. Then, the waste storage box 150 is loaded onto the self-driving vehicle robot 300 by the gripping hand of the self-driving vehicle robot 300 or an arm of the disposal robot 323.

Now, a method of how the self-driving vehicle robot 300 sorts waste to be disposed of by type will be described. One or more types of waste may be collected depending on how waste is sorted or upon a request from the user. Also, some or the entire waste is collected depending on how the self-driving inlet robot 323 sorts the waste, while communicating with the self-driving inlet robot 100 about preset waste types.

As for the disposal robot (maintenance robot), the disposal robot (maintenance robot) riding the self-driving vehicle robot 300 comes out and moves the self-driving inlet robot 100 to a waste inlet of the self-driving vehicle robot 300 to put waste in it. Waste piled up or left in a certain place is disposed into an inlet of the self-driving vehicle robot 300, and, when there is something wrong with the self-driving vehicle robot 300, repairs are done or urgent measures are taken.

According to an exemplary embodiment of the present disclosure, it is possible to allow for self-driving and efficient collection of waste in densely populated areas, such as apartment complexes and residential neighborhoods, and areas with a floating population by using robots with built-in artificial intelligence software and hardware and self-driving waste collection and driving functions and an integrated management server for monitoring these robots, and help to put information together in this process and use it as base data for the efficient operation of future waste policies and the corresponding systems.

As described above, although the embodiments of the present disclosure have been described in connection with specific matters, such detailed elements, and the limited embodiments and drawings, they are provided only to help general understanding of the present disclosure, and the present disclosure is not limited to the embodiments. A person having ordinary skill in the art to which the present disclosure pertains may modify the present disclosure in various ways from the above description.

Accordingly, the spirit of the present disclosure should not be construed as being limited to the embodiments, and not only the claims to be described later, but also all equal or equivalent modifications thereof should be constructed as belonging to the category of a spirit of the present disclosure.

What is claimed is:

1. An artificial intelligence integrated system for optimizing waste management by a self-guided robot, the system comprising self-driving inlet robots, a self-driving vehicle robot, and a web-based integrated management server, the self-driving inlet robots each comprising a body portion, a sensor portion, a waste collection behavior portion, and a controller, the body portion comprising a top inlet and a side inlet for receiving waste and a first outlet for discharging the waste, the sensor portion comprising a lidar sensor, a radar sensor, a GPS, and a weight measuring sensor that are mounted to the body portion, the waste collection behavior portion comprising a first waste collection arm and a second waste collection arm that are mounted to the body portion and grip and put the waste into the top inlet and side inlet, respectively, a compression plate that opens and closes the top inlet and compresses the waste in the body portion by vertical movement, and a side door rotatably mounted to the body portion so as to open and close the side inlet, the controller being configured to control operations of each component of the waste collection behavior portion and to preset a capacity limit for the waste stored in the body portion, the web-based integrated management server being configured to receive, store, and manage at least one among user identification information, waste kind information, waste measurement information, charging information, and payback information transmitted from the self-driving inlet robots, and being installed in a pre-designated place where the self-driving inlet robots gather together, wherein the self-driving inlet robots operate as either a first kind which makes a measurement on a waste item based on either weight, volume, or number and then charges a fee or not based on the measurement information, or a second kind which makes a measurement on a recyclable waste item based on either weight, volume, or number and then pays back a fee or not based on the measurement information, the self-driving vehicle robot comprising a driving body portion, a disposal means including a gripping hand, a sensing portion, and a controller, the driving body portion comprising a first inlet on the top and a second inlet on the side, which are for putting the waste in, a second outlet for discharging the waste, and a transportation device, the disposal means being mounted to the driving body portion of the self-driving vehicle robot, for putting the waste stored in at least one of the self-driving inlet robots into the driving body portion of the self-driving vehicle robot, the sensing portion comprising a GPS for self-driving and other sensors, and being mounted to the driving body portion, and the controller of the self-driving vehicle robot being configured to control operations of the transportation device of the driving body portion and the disposal means, based on a signal sensed by the sensing portion and a preset driving program, wherein the self-driving vehicle robot drives itself, collects waste, and self-drives and returns to a pre-designated waste disposal site, in response to an operation request signal received from the outside or on a preset self-driving cycle.

2. The artificial intelligence integrated system of claim 1, wherein:

the other sensors of the sensing portion of the self-driving vehicle robot include an object recognition sensor and a camera; and the self-driving vehicle robot collects the waste in the self-driving inlet robots or waste piled up or dumped on a street, sidewalk, or other places recognized by the object recognition sensor and the camera of the sensing portion of the self-driving vehicle robot.

3. The artificial intelligence integrated system of claim 2, wherein:

the self-driving vehicle robot, which collects the waste in the self-driving inlet robots, monitors a waste disposal state, location, moving state, and surrounding state of each self-driving inlet robot;

the self-driving vehicle robot determines a state of each self-driving inlet robot based on its waste disposal state, location, moving state, and surrounding state; and the self-driving vehicle robot moves sequentially to the self-driving inlet robots to collect the waste loaded in the self-driving inlet robots based on the state of each of the self-driving inlet robots.

* * * * *